(12) United States Patent
Khalid et al.

(10) Patent No.: US 10,581,874 B1
(45) Date of Patent: Mar. 3, 2020

(54) MALWARE DETECTION SYSTEM WITH CONTEXTUAL ANALYSIS

(71) Applicant: FireEye, Inc., Milpitas, CA (US)

(72) Inventors: Yasir Khalid, Fremont, CA (US); Sai Omkar Vashisht, Morgan Hill, CA (US); Alexander Otvagin, Campbell, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/986,417

(22) Filed: Dec. 31, 2015

(51) Int. Cl.
  *H04L 9/00* (2006.01)
  *H04L 29/06* (2006.01)
  *H04L 29/08* (2006.01)

(52) U.S. Cl.
  CPC ...... *H04L 63/1416* (2013.01); *H04L 63/1425* (2013.01); *H04L 63/1433* (2013.01); *H04L 67/02* (2013.01); *H04L 67/06* (2013.01)

(58) Field of Classification Search
  USPC .......................................................... 726/23
  See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Marchette, David J., "Computer Intrusion Detection and Network Monitoring: A Statistical Viewpoint", ("Marchette"), (2001).

(Continued)

*Primary Examiner* — Christopher J Brown
(74) *Attorney, Agent, or Firm* — Rutan & Tucker, LLP

(57) ABSTRACT

A computerized method for detecting malware associated with an object. The method includes operations of analyzing an object to obtain a first set of attributes, where the first set of attributes include one or more characteristics associated with the object. Furthermore, the object is processed with a virtual machine to obtain a second set of attributes. The second set of attributes corresponds to one or more monitored behaviors of the virtual machine during processing of the object. Thereafter, a threat index is determined based, at least in part, on a combination of at least one attribute of the first set of attributes and at least one attribute of the second set of attributes. The threat index represents a probability of maliciousness associated with the object.

22 Claims, 8 Drawing Sheets

(56) References Cited

U.S. PATENT DOCUMENTS

| | | | |
|---|---|---|---|
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,772,345 B1 * | 8/2004 | Shetty ............ G06F 21/562 713/151 |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,685,271 B1 * | 3/2010 | Schneider ............ H04L 43/50 709/204 |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 * | 11/2012 | Green ............ H04L 63/1416 718/1 |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |

(56) References Cited

U.S. PATENT DOCUMENTS

| | | | |
|---|---|---|---|
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,476 B2 | 10/2013 | Shifter et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,469 B1 | 1/2014 | Chen et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,756,693 B2* | 6/2014 | Dube | G06F 21/564 |
| | | | 713/188 |
| 8,776,229 B1 | 7/2014 | Aziz | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,278 B2 | 7/2014 | Frazier et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,850,570 B1 | 9/2014 | Ramzan | |
| 8,850,571 B2 | 9/2014 | Staniford et al. | |
| 8,881,234 B2 | 11/2014 | Narasimhan et al. | |
| 8,881,271 B2 | 11/2014 | Butler, II | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,949,257 B2 | 2/2015 | Shifter et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,027,140 B1* | 5/2015 | Watkins | G06Q 30/0277 |
| | | | 709/219 |
| 9,071,638 B1 | 6/2015 | Aziz et al. | |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,118,715 B2 | 8/2015 | Staniford et al. | |
| 9,152,782 B2* | 10/2015 | Lin | G06F 21/44 |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,292,686 B2 | 3/2016 | Ismael et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,319,423 B2 | 4/2016 | Jover et al. | |
| 9,355,247 B1 | 5/2016 | Thioux et al. | |
| 9,356,944 B1 | 5/2016 | Aziz | |
| 9,363,280 B1 | 6/2016 | Rivlin et al. | |
| 9,367,681 B1 | 6/2016 | Ismael et al. | |
| 9,398,028 B1 | 7/2016 | Karandikar et al. | |
| 9,413,781 B2 | 8/2016 | Cunningham et al. | |
| 9,426,071 B1 | 8/2016 | Caldejon et al. | |
| 9,430,646 B1 | 8/2016 | Mushtaq et al. | |
| 9,432,389 B1 | 8/2016 | Khalid et al. | |
| 9,438,613 B1 | 9/2016 | Paithane et al. | |
| 9,438,622 B1 | 9/2016 | Staniford et al. | |
| 9,438,623 B1 | 9/2016 | Thioux et al. | |
| 9,459,901 B2 | 10/2016 | Jung et al. | |
| 9,467,460 B1 | 10/2016 | Otvagin et al. | |
| 9,483,644 B1 | 11/2016 | Paithane et al. | |
| 9,495,180 B2 | 11/2016 | Ismael | |
| 9,497,213 B2 | 11/2016 | Thompson et al. | |
| 9,507,935 B2 | 11/2016 | Ismael et al. | |
| 9,516,057 B2 | 12/2016 | Aziz | |
| 9,519,781 B2* | 12/2016 | Golshan | G06F 21/53 |
| 9,519,782 B2 | 12/2016 | Aziz et al. | |
| 9,536,091 B2 | 1/2017 | Paithane et al. | |
| 9,537,972 B1 | 1/2017 | Edwards et al. | |
| 9,560,059 B1 | 1/2017 | Islam | |
| 9,565,202 B1 | 2/2017 | Kindlund et al. | |
| 9,591,015 B1 | 3/2017 | Amin et al. | |
| 9,591,020 B1 | 3/2017 | Aziz | |
| 9,594,904 B1 | 3/2017 | Jain et al. | |
| 9,594,905 B1 | 3/2017 | Ismael et al. | |
| 9,594,912 B1 | 3/2017 | Thioux et al. | |
| 9,609,007 B1 | 3/2017 | Rivlin et al. | |
| 9,626,509 B1 | 4/2017 | Khalid et al. | |
| 9,628,498 B1 | 4/2017 | Aziz et al. | |
| 9,628,507 B2 | 4/2017 | Haq et al. | |
| 9,633,134 B2 | 4/2017 | Ross | |
| 9,635,039 B1 | 4/2017 | Islam et al. | |
| 9,641,546 B1 | 5/2017 | Manni et al. | |
| 9,654,485 B1 | 5/2017 | Neumann | |
| 9,661,009 B1 | 5/2017 | Karandikar et al. | |
| 9,661,018 B1 | 5/2017 | Aziz | |
| 9,674,298 B1 | 6/2017 | Edwards et al. | |
| 9,680,862 B2 | 6/2017 | Ismael et al. | |
| 9,690,606 B1 | 6/2017 | Kla et al. | |
| 9,690,933 B1 | 6/2017 | Singh et al. | |
| 9,690,935 B2 | 6/2017 | Shifter et al. | |
| 9,690,936 B1 | 6/2017 | Malik et al. | |
| 9,736,179 B2 | 8/2017 | Ismael | |
| 9,740,857 B2 | 8/2017 | Ismael et al. | |
| 9,747,446 B1 | 8/2017 | Pidathala et al. | |
| 9,756,074 B2 | 9/2017 | Aziz et al. | |
| 9,773,112 B1 | 9/2017 | Rathor et al. | |
| 9,781,144 B1 | 10/2017 | Otvagin et al. | |
| 9,787,700 B1 | 10/2017 | Amin et al. | |
| 9,787,706 B1 | 10/2017 | Otvagin et al. | |
| 9,792,196 B1 | 10/2017 | Ismael et al. | |
| 9,824,209 B1 | 11/2017 | Ismael et al. | |
| 9,824,211 B2 | 11/2017 | Wilson | |
| 9,824,216 B1 | 11/2017 | Khalid et al. | |
| 9,825,976 B1 | 11/2017 | Gomez et al. | |
| 9,825,989 B1 | 11/2017 | Mehra et al. | |
| 9,838,408 B1 | 12/2017 | Karandikar et al. | |
| 9,838,411 B1 | 12/2017 | Aziz | |
| 9,838,416 B1 | 12/2017 | Aziz | |
| 9,838,417 B1 | 12/2017 | Khalid et al. | |
| 9,846,776 B1 | 12/2017 | Paithane et al. | |
| 9,876,701 B1 | 1/2018 | Caldejon et al. | |
| 9,888,016 B1 | 2/2018 | Amin et al. | |
| 9,888,019 B1 | 2/2018 | Pidathala et al. | |
| 9,910,988 B1 | 3/2018 | Vincent et al. | |
| 9,912,644 B2 | 3/2018 | Cunningham | |
| 9,912,681 B1 | 3/2018 | Ismael et al. | |
| 9,912,684 B1 | 3/2018 | Aziz et al. | |
| 9,912,691 B2 | 3/2018 | Mesdaq et al. | |
| 9,912,698 B1 | 3/2018 | Thioux et al. | |
| 9,916,440 B1 | 3/2018 | Paithane et al. | |
| 9,921,978 B1 | 3/2018 | Chan et al. | |
| 9,934,376 B1 | 4/2018 | Ismael | |

(56) References Cited

U.S. PATENT DOCUMENTS

| | | |
|---|---|---|
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B2 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhaf et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |

(56) References Cited

U.S. PATENT DOCUMENTS

| | | |
|---|---|---|
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192222 A1* | 7/2010 | Stokes .............. G06F 21/563 726/22 |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |

(56) References Cited

U.S. PATENT DOCUMENTS

| | | |
|---|---|---|
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shifter et al. |
| 2013/0318073 A1 | 11/2013 | Shifter et al. |
| 2013/0325791 A1 | 12/2013 | Shifter et al. |
| 2013/0325792 A1 | 12/2013 | Shiffer et al. |
| 2013/0325871 A1 | 12/2013 | Shifter et al. |
| 2013/0325872 A1 | 12/2013 | Shifter et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0059684 A1 | 2/2014 | Wyschogrod et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0256552 A1* | 9/2015 | Lee .................. G06F 21/566 726/24 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0219063 A1 | 7/2016 | Nadkarni et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/23805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

(56) References Cited

OTHER PUBLICATIONS

Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Wthyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.eduLabout.chris/research/doc/esec07.sub.--mining-pdf-.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
AltaVista Advanced Search Results. "attack vector identifier". Http://www.altavista.com/web/results?ltag=ody&pg=aq&aqmode=aqa= Event+Orch- estrator . . . , (Accessed on Sep. 15, 2009).
AltaVista Advanced Search Results. "Event Orchestrator". Http://www.altavista.com/web/results?ltag=ody&pg=aq&aqmode=aqa= Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Viral, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filial, Eric, et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http://eeexplore.ieee.org/searchresult.jsp?SortField= Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).

(56) References Cited

OTHER PUBLICATIONS

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim,H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King") (2003).

Krasnyansky, Max , et al., Universal TUN/TAP driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael , et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Compare& "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Hiroshi Shinotsuka, Malware Authors Using New Techniques to Evade Automated Threat Analysis Systems, Oct. 26, 2012, http://www.symantec.com/connect/blogs/, pp. 1-4.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Lastline Labs, The Threat of Evasive Malware, Feb. 25, 2013, Lastline Labs, pp. 1-8.

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

\* cited by examiner

MALWARE DETECTION SYSTEM WITH CONTEXTUAL ANALYSIS

FIELD

Embodiments of the disclosure relate to the field of cyber-security. More specifically, one embodiment of the disclosure relates to a system, apparatus and method configured to detect malicious objects based on an analysis of contextual information.

GENERAL BACKGROUND

Over the last decade, malicious software has become a pervasive problem for Internet users as many networked resources include vulnerabilities that are subject to attack. For instance, over the past few years, an increasing number of vulnerabilities are being discovered in software that is loaded onto network devices, such as vulnerabilities within operating systems, for example. While some vulnerabilities continue to be addressed through software patches, prior to the release of such software patches, network devices will continue to be targeted for attack by malware, namely information such as computer code that attempts during execution to take advantage of a vulnerability in computer software by acquiring sensitive information or adversely influencing or attacking normal operations of the network device or the entire enterprise network.

Moreover, with the proliferation of the Internet and the reliance on electronic email (email) as a means of communication, malware is capable of spreading more quickly and affecting a larger subset of the population than ever before.

Although some conventional malware detection systems may be configured to evaluate objects for malware, these conventional systems may produce "false negative" or "false positive" outcomes because the classification of the objects is based on a collection of scores that concentrate on results associated with a single type of analysis. For example, according to conventional malware detection systems, the results from a static analysis of an object (analysis of characteristics of the object) are correlated and subsequently assigned a first score while results from a behavioral analysis of the object (analysis of behaviors associated with the object during processing) are correlated and subsequently assigned a second score. The first and second scores are evaluated to classify the object as malicious or non-malicious.

As a result, in accordance with conventional malware detection systems, an object may contain features that, when analyzed in isolation, may fail to identify the object as malicious when the feature itself does not exhibit maliciousness during the scanning process. This "false negative" tends to occur for objects that are part of a greater, multi-stage attack. Consequently, the malicious object may be allowed to pass through to the end user. It is contemplated that conventional malware detection systems may also experience a "false positive" outcome since there is no correlation of results from different analyses of the object to determine whether the object is malicious.

Accordingly, a need exists for an improved malware detection system, apparatus and method that further mitigates inaccurate outcomes concerning malware detection.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
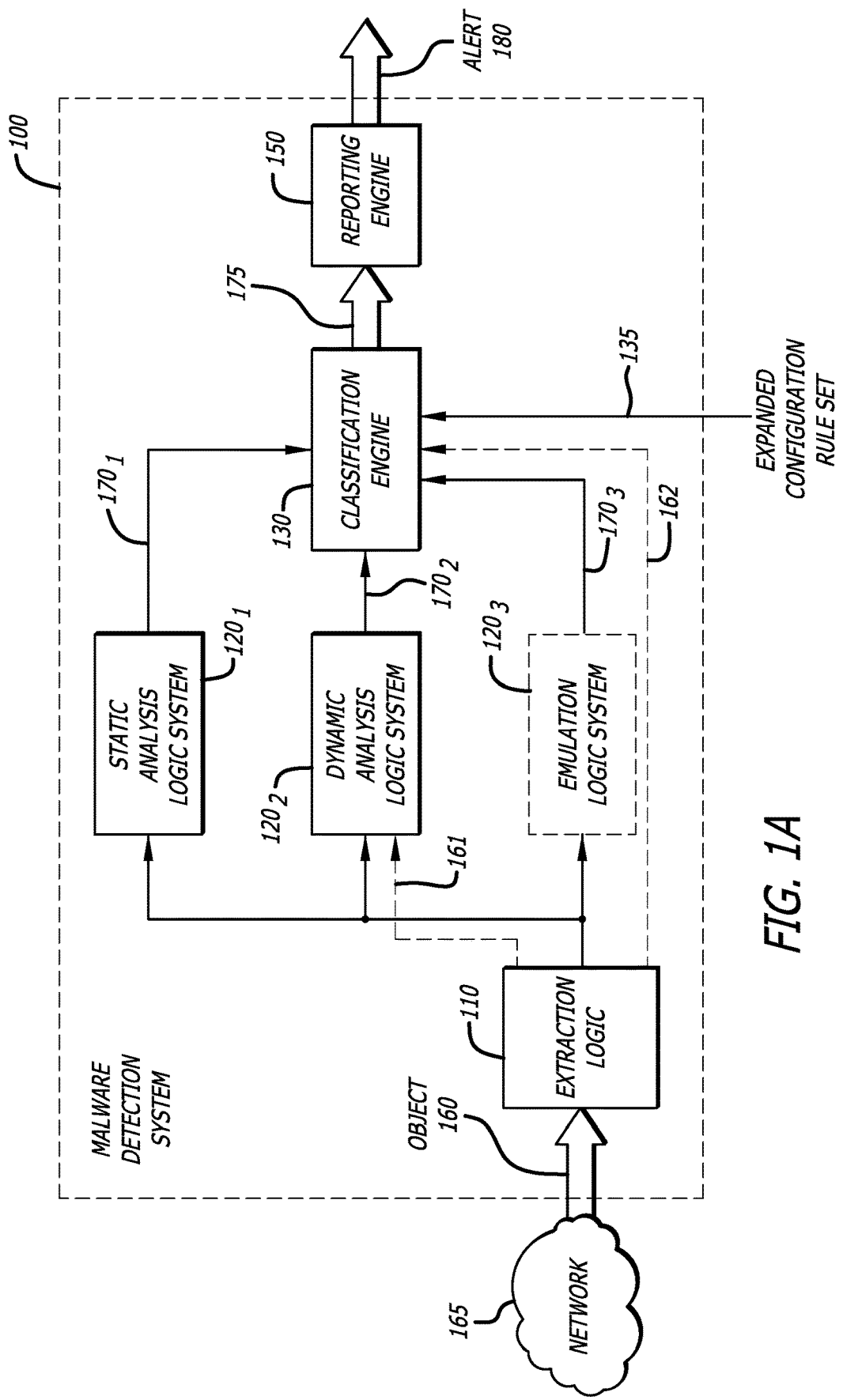
FIG. 1A is an exemplary block diagram of an operational flow of an malware detection system within a network device.

Embodiments of the present disclosure generally relate to a malware detection system configured to detect and classify one or more objects based on a correlation of analytic results that are produced from different types of analyses conducted on that object. According to one embodiment of the disclosure, these analytic results, generally referred to herein as "attributes," may feature (1) one or more (a first set of) behaviors that include monitored activity or inactivity by the object during processing (herein, "behavior(s)") and (2) one or more (a second set of) characteristics of the object that include certain information pertaining to the object acquired without executing or opening the object (herein, "characteristic(s)"). Examples of types of monitored behaviors may include communication-based or execution-based activities (especially anomalies) while types of detected characteristics may include metadata, any formatting information (especially anomalies) of the object, and/or a score associated with the behavior(s) or characteristic(s). Of course, it is contemplated that these analytic results may further include results obtained from emulated operations on the object (herein, "emulated result(s)").

Specifically, the malware detection system features a plurality of analysis logic systems. Communicatively coupled to attribute correlation logic of a classification engine, each of the analysis logic systems separately analyzes different aspects of an object under analysis. Such analyses produce attributes and these attributes are provided to the attribute correlation logic. Operating in accordance with an extended correlation rule set, the attribute correlation logic may analyze the received attributes not only for the presence or absence of certain attributes, but also the presence or absence of certain combinations of attributes, including one or more combination of attributes received from different analysis logic systems (herein referred to as "multi-type attribute combinations"). The different analysis logic systems may include at least an analysis logic system that involves processing (execution) of the object (e.g., dynamic analysis) and an analysis logic system that scans for content associated with the object without its opening or execution (e.g., static analysis). The attributes and certain combinations of attributes constitute contextual information that is used for determining threat indices, which are relied upon in determining whether or not the object is malicious.

Responsive to receiving contextual information from the attribute correlation logic, threat index generation logic determines a threat index associated with the object. The threat index may be used to represent, at least in part, (i) a score that corresponds to the likelihood of the object being malicious (e.g., object includes malware or is part of a malicious attack); (ii) a policy violation involving a detected presence of a certain type of object (e.g., receipt of a particular type of document including macros, etc.); (iii) a severity of a potential malicious attack associated with the object; or (iv) an ordering (priority) for secondary contextual analysis (as needed).

According to one embodiment of the disclosure, each attribute (e.g., each characteristic, behavior, and/or emulated result) provided from the plurality of analysis logic systems may be associated with a threat index value. Additionally, or in the alternative, multi-type attribute combinations (i.e., combinations of attributes provided from the different analysis logic systems) may be assigned threat index values. The threat index for the object may be produced as an aggregate of these threat index values or as a function of some or all of these index values. As a result, object classification is accomplished by determining a threat index (level) of the object that is based, at least in part, on the existence of one or more selected groups of attributes from different types of analyses (e.g., one or more characteristics and one or more behaviors) instead of simply relying on discrete correlations of analytic results from the static analysis and the analytic results from the dynamic analysis. This consideration of multi-type attribute combinations for object classification increases malware detection accuracy, which reduces the number of "false negative" results as well as "false positive" results.

Additionally, or in the alternative, the above-described malware detection involves a correlation of attributes across one or more vectors. A "vector" includes information that is directed to the delivery mechanism of the object. For instance, as an illustrative example, for a vector based on network (packet-based) communications, the attributes may include information extracted from a header of a packet such as a source address (e.g., Internet Protocol "IP" address, domain name, etc.) or a destination address. As another illustrative example, for a vector based on email communications, the attributes may include information within the body or header of the email message, such as information associated with the "From" field (e.g., the email sender's information/address), the "To" field (e.g., the email recipient's information/address; the "Subject" line, or the like.

The correlation of the attributes across one or more vectors may improve accuracy in the classification of the object. Also, it is further contemplated that cross vector analysis may be particularly useful in detecting multi-stage attacks, which may have components delivered to a targeted network device across multiple vectors in an attempt to infiltrate the targeted network device.

Additionally, or in the alternative, the classification engine may further prompt a secondary contextual analysis after a contextual analysis of the attributes (e.g., monitored behavior(s) and/or detected characteristic(s)) has been conducted. The secondary contextual analysis may correspond to a "hunting" for particular attributes, such as particular characteristic(s) of the object (as determined by a static analysis logic system) and/or particular behavior(s) of the object (as determined by a dynamic analysis logic system) for example, which may increase or decrease the threat index currently associated with the object. Hence, using the secondary contextual analysis, a more robust object classification scheme is provided for determining whether the object under analysis is malicious or non-malicious.

Herein, according to one embodiment of the disclosure, the secondary contextual analysis may be triggered by an event whose occurrence may want a more in-depth analysis to mitigate potential "false negative" and "false positive" outcomes. The event may simply include a detection of the object under analysis being suspicious (i.e., neither definitively malicious nor definitively non-malicious (benign)). For instance, in response to the one or more monitored behaviors being determined to provide a "borderline" threat index that the object under analysis is malicious (e.g., barely exceeds a malicious threshold), the classification engine may examine particular attributes (e.g., certain characteristics provided by the static analysis logic system). The particular characteristic(s) may be selected based on one or more correlation rules provided to the classification engine, where these rules now include targeted analysis associated with combinations of behavior(s) and/or characteristic(s) associated with previous determined malicious objects. Also, the presence of the particular characteristic(s) provide further evidence that the object is malicious (or non-malicious), which may cause the threat index associated with the object to either increase to more definitely identify that the object is malicious (reduce "false negative" outcomes) or decrease to now fall under the threshold (reduce "false positive" outcomes).

Additionally, in order to avoid a false positive verdict, the secondary contextual analysis may be triggered in response to an observation by an analysis logic system of the object conducting a malicious activity that may not have been fully considered in light of other characteristics or behaviors. Also, it is further contemplated that the secondary contextual analysis may be triggered based on a particular behavior conducted by the object during processing which is commonly, based on experiential knowledge or machine learning, associated with particular observable characteristics that were not identified during the prior contextual analysis.

Once maliciousness has been confirmed with regard to the object, an alert is generated. The alert (e.g., a type of messages including text message or email message, a transmitted displayable image, or other types of information transmitted over a wired or wireless communication path) warns a network administrator that an analyzed object has been detected by the malware detection system as malicious. The alert may include the threat index for the object under analysis and some or all of its observed attributes, and in some embodiments, a signature and contextual information that identifies the detected malware attack type, including without limitation, phishing campaigns, Advanced Persistent Threats (APT), Point-Of-Sales attacks (POS), Crimeware attacks, or the like.

Terminology

In the following description, certain terminology is used to describe features of the invention.

In certain situations, both terms "logic," "logic system," "engine" and "component" are representative of hardware, firmware and/or software that is configured to perform one or more functions. As hardware, logic (or engine or component) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or logic system/engine/component) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

Hence, the term "computerized" generally represents that any corresponding operations are conducted by hardware in combination with software and/or firmware.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence a potential presence of malware and allow the object to be classified as malicious.

Examples of objects may include one or more flows or one or more self-contained elements. A "flow" generally refers to related packets that are received, transmitted, or exchanged within a communication session. For convenience, a packet is broadly referred to as a series of bits or bytes having a prescribed format, which may include packets, frames, or cells. One example of a flow is an electronic mail (email) message that includes related packets received as a transmission.

As another illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); or Simple Mail Transfer Protocol (SMTP); or Internet Message Access Protocol (IMAP); or Post Office Protocol (POP)), or (2) inter-process communications (e.g., Remote Procedure Call "RPC" or analogous processes, etc.). Moreover, the object may be featured with a message as an attachment, for example.

Similarly, as another illustrative example, the object may be one or more self-contained elements, which may include an attachment to a message. The object, as one or more self-contained elements, may include, but is not limited or restricted to, an executable file, non-executable file (such as a document or a dynamically link library), a Portable Document Format (PDF) file, a JavaScript file, Zip file, a Flash file, a document (for example, a Microsoft Office® document), an electronic mail (email), a HyperText Markup Language (HTML) file representing a downloaded web page, an instant messaging element in accordance with Session Initiation Protocol (SIP) or another messaging protocol, or the like. The object may also refer to any of various files, including, but not limited to executable programs (file types: .com, .exe, .vbs, .zip, .scr, .dll, .pif, .js), macros (file types: .doc, .dot, .pdf, .ppt, .xls, .xlt), embedded scripts, Uniform Resource Locators (URLs), and the like. The object is made available to the malware detection system as data itself or a reference (e.g., pointer, file path, etc.) to a storage location of the object.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of a network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another situation. Additionally, malware may be code that initiates unwanted behavior which may be, as one example, uploading a contact list from an endpoint device to cloud storage without receiving permission from the user.

In certain instances, the term "detected" is used herein to represent that there is a prescribed level of confidence (or probability) of an occurrence. The terms "compare" or "comparison" generally mean determining if a match (e.g., a certain level of correlation) is achieved between two items where one of the items may include a particular data pattern.

The term "network device" should be construed as any electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, etc.

Finally, the terms "or" and "and/or" as used herein are to be interpreted as inclusive or meaning any one or any combination. Hence, "X, Y or Z" or "X, Y and/or Z" mean "any of the following: X; Y; Z; X and Y; X and Z; Y and Z; X, Y and Z." An exception to this definition may occur when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Object Analysis Methodology

A. General Architecture of the Malware Detection System

FIG. 1A is an exemplary block diagram of the general operational flow of a malware detection system 100. The malware detection system 100 includes an extraction logic 110, a plurality of analysis logic systems $120_1$-$120_N$ (N≥1; N=3 in FIG. 1A), a classification engine 130 and reporting engine 150. As shown, the extraction logic 110 receives an object 160 via a network 165, although it is contemplated that the object 160 may be uploaded to the malware detection system 100 directly from a peripheral source (e.g., off-line storage device, portable storage device, etc.). The extraction logic 110 is configured to gather meta information associated with the object 160. The meta information may include meta data 161 that may be used to configure one or more virtual machines (not shown) within a dynamic analysis logic system $120_2$. Additionally, or in an alternative, the meta information may further include meta data 162 provided to the classification engine 130 for use, at least in part, in classifying the object 160 as malicious or non-malicious.

Thereafter, some or all of the analysis logic systems $120_1$-$120_N$, such as the static analysis logic system $120_1$ and the dynamic analysis logic system $120_2$ for example, may be configured to receive information associated with the object 160 for analysis. During or after analysis, the analysis logic systems $120_1$-$120_N$ provide analytic results (also referred to as "attributes") to the classification engine 130. The attributes $170_1$-$170_N$ from the respective analysis logic systems $120_1$-$120_N$ may be correlated and classified by the classification engine 130 for determining whether the object 160 is malicious.

Figure 1B:
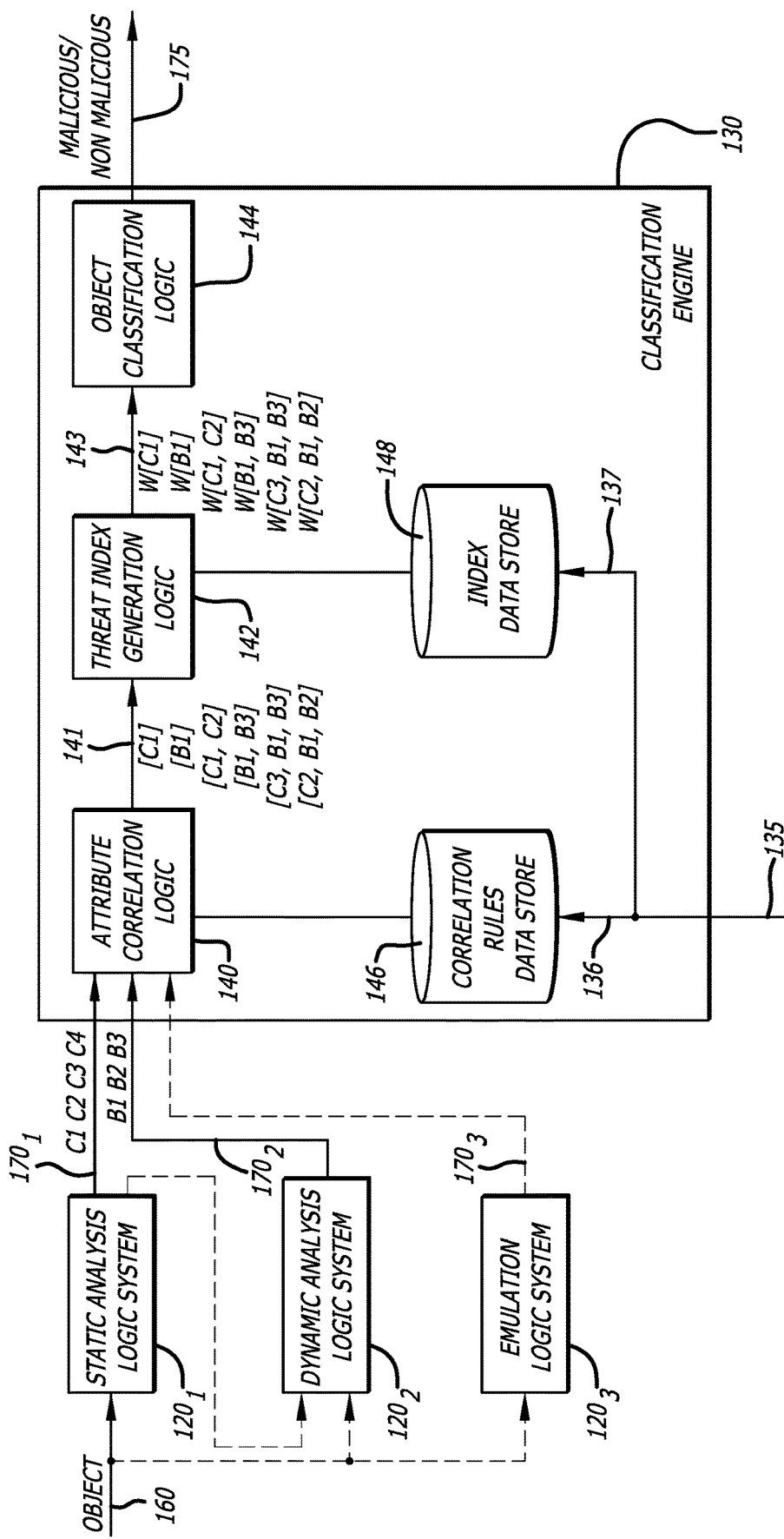
FIG. 1B is a logical representation of the classification engine in communication with the static analysis logic system, the dynamic (behavioral) analysis logic system, and optionally the emulation logic system of FIG. 1A.

More specifically, based on an expanded configuration rule set 135, the classification engine 130 may be configured for determining whether or not the object 160 should be classified as malicious. As shown in FIG. 1B, the expanded configuration rule set 135 includes an expanded correlation rule set 136 and an expanded threat index set 137. The expanded correlation rule set 136 identifies attribute patterns relied upon for malware detection, where these attribute patterns now include patterns of attribute combinations from different types of analyses (e.g., an attribute pattern including one or more behaviors and one or more characteristics; an attribute pattern including one or more behaviors and one or more emulated results; etc.). The presence or absence of these combinations of attributes from different types of analyses (herein, "multi-type attribute combination") is used in determining whether the object 160 is malicious or non-malicious. The expanded threat index set 137 includes threat indices associated with the attribute patterns, including one or more attribute patterns associated with a combination of attributes from different types of analyses (herein, "multi-type attribute pattern").

Referring still to FIG. 1B, a logical representation of the classification engine 130 based on received attributes from the static analysis logic system $120_1$, the dynamic (behavioral) analysis logic system $120_2$, and optionally the emulation logic system $120_3$ is shown. Herein, the object 160 may be analyzed by static analysis logic system $120_1$, which determines characteristics of the object 160 such as formatting or patterns of content for the object 160, and provide such characteristics $170_1$ to the classification engine 130. The attributes (characteristics) $170_1$ provided from the static analysis logic system $120_1$ to the classification engine 130 are illustrated as four characteristics referenced as C1, C2, C3 & C4.

Additionally, the dynamic analysis logic system $120_2$ may receive object 160, perhaps concurrently with the static analysis logic system $120_1$ or from the static analysis logic system $120_2$ after analysis. Herein, the dynamic analysis logic system $120_2$ may monitor for one or more anomalous (or undesirable) behaviors by a virtual machine (not shown) during its processing of the object 160. The anomalous (or undesirable) behaviors $170_2$ may include communication-based anomalies and/or execution-based anomalies, described below. These attributes (behaviors) $170_2$ provided from the dynamic analysis logic system $120_2$ to the classification engine 130 are illustrated as three monitored behaviors referenced as B1, B2 & B3.

Lastly, as an optional logic system, the emulation logic system $120_3$ may receive the object 160, concurrently with or subsequent to another analysis. Herein, the emulation logic system $120_3$ may emulate functionality of a targeted client device that conducts operations on the object 160 to produce one or more emulated results $170_3$. As shown, in this illustrative embodiment, no attributes $170_3$ are provided from the emulation logic system $120_3$ to the classification engine 130. However, it is contemplated that, when in operation, emulation logic system $120_3$ may provide one or more emulated results (E1 . . . ) to the classification engine 130.

As further shown in FIG. 1B, the classification engine 130 includes attribute correlation logic 140, threat index generation logic 142 and object classification logic 144. Herein, the attribute correlation logic 140 is configured to receive attributes $170_1$, $170_2$ and/or $170_3$ from logic systems $120_1$, $120_2$ and/or $120_3$ respectively. The attribute correlation logic 140 attempts to correlate some or all of the attributes $170_1$-$170_3$ associated with the object 160 in accordance with the expanded correlation rule set 136, which is stored in correlation rules data store 146 (and can be updated as part of configuration rules 135). For this embodiment, the correlation determines what particular attributes and/or combination of attributes, including multi-type attribute combinations, have been collectively detected by the static analysis logic system $120_1$ and dynamic analysis logic system $120_2$ in accordance with the attribute patterns set forth in the expanded correlation rule set 136.

Herein, as a non-limiting illustration, the attributes and/or combinations of attributes constitute contextual information 141 associated with the object 160, which are provided to the threat index generation logic 142 to determine one or more threat indices 143. The operability of the threat index generation logic 142 is controlled by the expanded threat index set 137, which are stored in index data store 148 and can be updated as part of the configuration rules 135. The one or more threat indices 143 are used by the objection classification logic 144 to determine whether or not the object 160 is malicious.

As shown for illustrative purposes in FIG. 1B, the contextual information 141 includes attributes [C1] and [B2]. The contextual information 141 further includes combinations of attributes from the same analysis type ([C1, C2] or [B1, B3]) as well as combination of attributes from different analysis types, referred to as "multi-type attribute combinations" ([C3, B1, B3] or [C2, B1, B2]). The contextual information 141 corresponds to correlated analytic results based on some or all of the attribute patterns set forth in the expanded correlation rule set 136.

Based on the contextual information 141, the threat index generation logic 142 produces threat index values 143 for these attributes and combinations of attributes: W[C1], W[B2], W[C2, C3], W[B1, B3], W[C3, B1, B3] and/or W[C2, B1, B2]. Based on these threat index values 143, the object classification logic 144 determines whether the object 160 is malicious or not, and provides results 175 associated with the analysis (e.g., some or all of the context information 141, meta information, threat index for object, etc.) to the reporting engine 150.

Figure 1C:
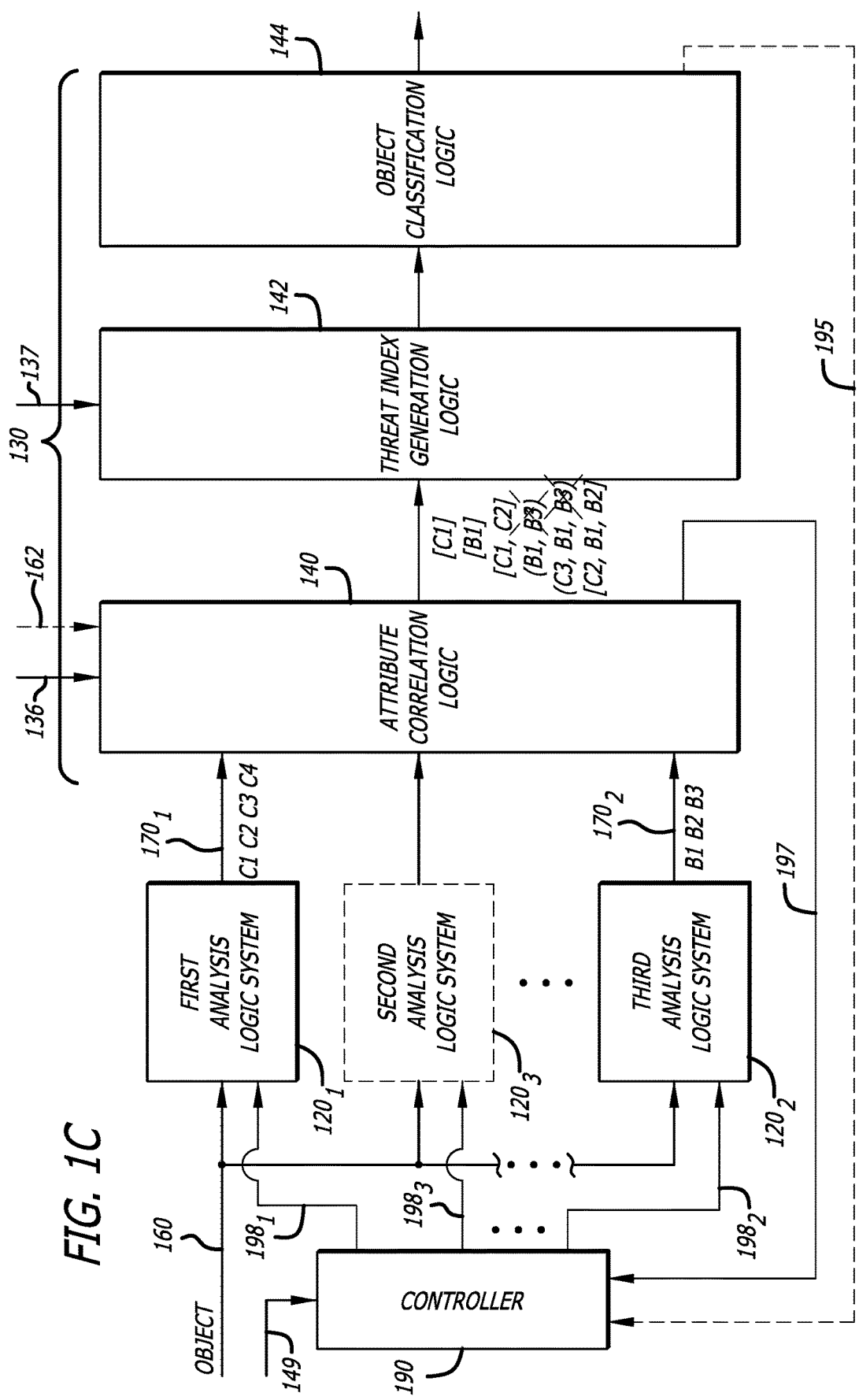
FIG. 1C is another logical representation of the classification engine of FIG. 1B in feedback communications with a controller for initiating secondary contextual analyses.

Referring to FIG. 1C, another illustrative example of the functionality the logic systems $120_1$-$120_N$ and the classification engine 130 is shown. Herein, the object 160 may be analyzed by one or more analysis logic systems, including at least a first analysis logic system $120_1$ (e.g., static analysis logic system $120_1$) and a second analysis logic system $120_2$ (e.g., dynamic analysis logic system $120_2$). As similarly illustrated in FIG. 1B, the first analysis logic system $120_1$ may provide attributes $170_1$ (referred as C1, C2, C3 & C4) to the attribute correlation logic 140 of the classification engine 130 while the second analysis logic system $120_2$ may provide attributes $170_2$ (referred as B1, B2 & B3) to the attribute correlation logic 140.

Herein, the provisioning of one or more virtual machines within the second analysis logic system $120_2$ may be conducted by a controller 190. According to one embodiment, the provisioning of the one or more virtual machines within the second analysis logic system $120_2$ may be initiated at least in part on meta data 149 associated with the object 160 and, in certain situations, feedback signaling 195 from the object classification logic 144. The controller 190 may provide location information for one or more software profiles (e.g., pointer, memory address, path, etc.) via communication path 1982, which enables re-provisioning of the one or more virtual machines within the second analysis logic system $120_2$.

According to one embodiment of the disclosure, the feedback signaling 195 may include information identifying an event that may cause the controller 190 to re-provision one or more virtual machines within the second analysis logic system $120_2$ with another software profile (e.g., another version, new software profile directed to processing a different object type, etc.). For instance, as an illustrative example, during processing of the object 160 within one or more virtual machines (not shown) of the second analysis logic system $120_2$, the object 160 may create another object (hereinafter "child object"), which constitutes one or more anomalous behaviors (e.g., behavior B1). During classification, the object classification logic 144 detects the presence of the child object, and in response, may return location information (e.g., memory address, pointer, file path, etc.) for the child object to the controller 190 via the feedback signaling 195. The feedback signaling 195 provides the controller 190 with information to conduct one or more additional analyses on the child object (e.g., additional static analysis to obtain characteristics that may assist in the provisioning of the one or more virtual machines within the second analysis logic system $120_2$ to subsequently process the child object).

Additionally, the attribute correlation logic 140 attempts to correlate some or all of the attributes $170_1$-$170_2$ associated with the object 160 in accordance with attribute patterns of the expanded correlation rule set 136. For this embodiment, the attribute correlation logic 140 determines whether particular attributes and combination of attributes, including multi-type attribute combinations, have been collectively detected by the static analysis logic system $120_1$ and dynamic analysis logic system $120_2$. However, according to this illustrative embodiment, one or more attributes (e.g., behavior B3) has not been detected so that multi-type attribute pattern [C3, B1, B3] has not been fully detected.

In certain situations (e.g., low workload, importance of the attribute pattern to the overall threat index computation for the object 160, etc.), the attribute correlation logic 140 may return feedback signaling 197 to the controller 190. In response to receipt of the feedback signaling 197, as represented by communication path $198_2$, the controller 190 may coordinate the scheduling (and even provisioning) of virtual machines (not shown) within the second analysis logic system $120_2$ to re-process the object 160 to focus monitoring operations on a presence of the attribute B3.

Stated differently, the attribute correlation logic 140 is configured to issue the feedback signaling 197 to controller 190, which commences one or more secondary contextual analyses via communication paths $198_1$-$198_N$ to confirm the presence or absence of one or more particular attributes of the object 160 have not been detected by the analysis logic systems $120_1$ and $120_2$. The secondary contextual analyses may be conducted to mitigate both false negative and false positive outcomes by improving accuracy of the malware detection analysis.

For instance, as an illustrative example, in response to receiving attributes $170_1$-$170_2$ during static and dynamic analysis of the object 160, the attribute correlation logic 140 and threat index generation logic 142 may collectively monitor whether the object 160 has a strong likelihood of being categorized as benign (e.g., collective threat index "0" or "1"), malicious (e.g., collective threat index "9" or "10") or suspicious (e.g. a collective mid-range threat index score ranging from "2" to "8"). When the object 160 is determined to be suspicious, the attribute correlation logic 140 may provide the feedback signaling 197 in response to one or more particular attributes, which may be set forth in the one or more multi-type attribute patterns of the expanded correlation rule set 136, being undetected. Thereafter, a confirmed presence or absence of any of these particular attributes may enable the object classification logic 144 to conclude, with greater certainty, that the object 160 should be categorized as malicious or non-malicious.

According to another embodiment of the disclosure, as described above, where the object 160 is determined to be highly malicious, the object classification logic 144 may return the feedback signaling 195 to signal the controller 190 to initiate a secondary contextual analysis to confirm that one or more particular attributes or combinations of attributes, which tends to have a larger influence on the classification of the object 160 than other attributes, have been detected. The secondary contextual analysis may be conducted to avoid a false positive result.

According to yet another embodiment of the disclosure, where the object 160 is determined to be associated with a particular vector based on received meta data 162 and/or with a particular characteristic as received from static analysis logic system $120_1$, the classification engine 130 may conduct the secondary contextual analysis to assign higher weighting to one or more particular activities conducted by the object 160 during analysis by the dynamic analysis logic system $120_2$.

Referring back to FIG. 1A, the classification engine 130 provides the results 175 of its analysis to reporting engine 150 for the purposes of reporting, if appropriate, and generating an alert 180. Herein, the alert 180 is a message that is responsible for warning a targeted entity (e.g., a network administrator) that the object 160 has been detected by the malicious detection system 100 as malicious. The alert 180 may include contextual information that identifies the object and detected malware attack type (e.g., object type, object name, source, destination, or timestamp applied when received over a network) as well as a threat index associated with the object. The threat index may be portrayed, for example as a number provided with other contextual information or an alteration of the other contextual information such as different font color is assigned for different threat index levels (e.g., dark red, 9-10 light red 8-9; orange 7-8, etc.), different font sizes, different image sizes, different positioning of the contextual information on the screen (at top, different area of the screen, different screen, etc.), or other different visual distinguishable features.

Figure 2:
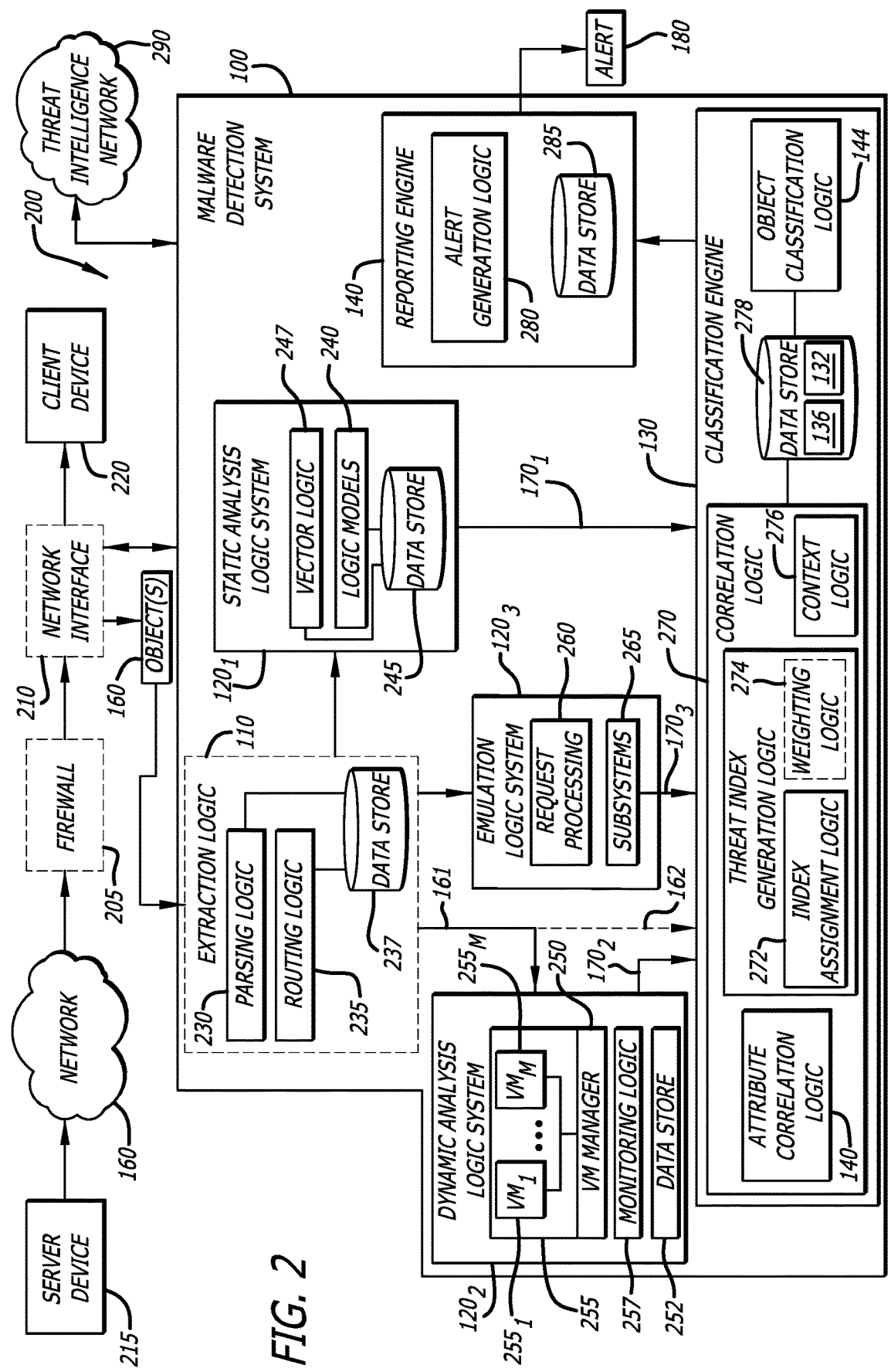
FIG. 2 is an exemplary block diagram of a communication system deploying the malware detection system of FIG. 1 via a network.

Referring now to FIG. 2, an exemplary block diagram of a communication system 200 that features the malware detection system 100 of FIGS. 1A-1C communicatively coupled to the network 165 via an optional firewall 205 and an optional network interface 210 (represented by dashed lines) is shown. Communications between a server device 215 and a client device 220 may be analyzed by the malware detection system 100.

According to the embodiment illustrated in FIG. 2, the malware detection system 100 may be configured as a network device that is adapted to analyze information associated with network traffic routed over the network 165 between at least one server device 215 and at least one client device 220. The network 165 may include a public network such as the Internet, in which case the optional firewall 205 may be interposed on the communication path between the public network and the client device 220. Alternatively, the network 165 may be a private network such as a wireless data telecommunication network, a wide area network, any type of local area network (e.g., LAN, WLAN, etc.), or a combination of networks.

As shown, the malware detection system 100 may be communicatively coupled with the network 165 via a network interface 210. In general, the network interface 120 operates as a data capturing device (sometimes referred to as a "tap" or "network tap") that is configured to receive data propagating to/from the client device 220 and provide at least some of this data to the malware detection system 100. Alternatively, the malware detection system 100 may be positioned as part of or behind the firewall 115 and in-line with client device 220.

According to one embodiment of the disclosure, the network interface 210 is capable of receiving and routing objects associated with network traffic to the malware detection system 100. The network interface 210 may provide the entire traffic or a certain subset of the network traffic, for example, such as one or more files that are part of a set of flows, packet payloads, or the like. In some embodiments, although not shown, network interface 210 may be contained within the malware detection system 100.

As shown in FIG. 2, the malware detection system 100 includes the extraction logic 110, the static analysis logic system $120_1$, the dynamic analysis logic system $120_2$, the emulation logic system $120_3$, the classification engine 130, and/or the reporting engine 150, a similar architecture as shown in FIG. 1A. Although some of the components disposed within the malware detection system 100 are shown in a communicatively coupled serial configuration, it is envisioned that other topologies may also be implemented, such as, for example, parallel and daisy-chain configurations. It should be appreciated that the extraction logic 110, the static analysis logic system $120_1$, the dynamic analysis logic system $120_2$, the emulation logic system $120_3$, the classification engine 130, and the reporting engine 150 may each be separate and distinct components, but the combination of components may also be implemented in a single block and/or core.

Once the object 160 is captured from the network traffic, it is communicated to the extraction logic 110 of the malware detection system 100. Herein, the extraction logic 110 comprises parsing logic 230, which is configured to extract meta information associated with the object 160. According to one embodiment, the meta information includes meta data 161 that may be used, at least in part by a virtual machine monitor 250, for provisioning one or more virtual machines 255 in the dynamic analysis logic system $120_2$. The one or more virtual machines (VMs) 255 conduct run-time processing of at least some of the information associated with the object 160. The meta data 161 may include data directed to the object type (e.g., PDF file, word processing document, HTML (web page) file, etc.), the type of operating system at the source that provided the object 160, web browser type, or the like.

Additionally, or in an alternative, the meta information may further include meta data 162 that may be provided to the classification engine 130. The meta data 162 may be used, at least in part, for classifying the object 160. For example, although not shown in detail, the meta data 162 may be directed to the delivery mechanism (message) associated with the object 160 which, depending on the object type, may include information extracted from a header of a packet (e.g., source IP address, destination IP address, etc.) or from the body or header of the email message (e.g., sender's email address, recipient's email address, subject line, etc.). Hence, although not shown in detail, the meta data 162 may be construed as another analysis type similar to the static analysis (characteristics), dynamic analysis (behaviors), and emulation (e.g., emulation results).

Similarly, it should be appreciated that aspects of the object 160 may require further analysis to determine various characteristics and behaviors. Consequently, routing logic 235 is configured so as to route information associated with the object 160 to one or more appropriate analysis logic systems, including the static analysis logic system $120_1$, dynamic analysis logic system $120_2$, and/or the emulation logic system $120_3$. A data store 237 may also be used to provide local storage for extraction analysis and rules, as well as operate as a local log. Based on experiential knowledge or machine-learning, the extraction analysis and rules may be periodically or aperiodically updated from a remote source (e.g., threat intelligence network 290).

Referring still to FIG. 2, the static analysis logic system $120_1$ is configured to inspect information associated with the object 160 using logic models 240 for anomalies in characteristics such as formatting anomalies for example. In some embodiments, the static analysis logic system $120_1$ may also be configured to analyze the object 160 for certain characteristics, which may include the object's name, type, size, path, or protocols. Additionally or in the alternative, the static analysis logic system $120_1$ may analyze the object 160 by performing one or more checks, including one or more signature checks, which may involve a comparison between (i) content of the object 160 and (ii) one or more pre-stored signatures associated with known malware. In one embodiment, such information may be stored on the data store 245. Checks may also include an analysis to detect exploitation techniques, such as any malicious obfuscation, using for example, probabilistic, heuristic, and/or machine-learning algorithms.

Additionally, the static analysis logic system $120_1$ may feature a plurality of rules that may be stored on the data store 245, for example, wherein the rules control the analysis conducted on the object 160. The rules may be based on experiential knowledge, including but not limited to machine learning; pattern matches; heuristic, probabilistic, or determinative analysis results; analyzed deviations in messaging practices set forth in applicable communication protocols (e.g., HTTP, TCP, etc.); analyzed compliance with certain message formats established for the protocol (e.g., out-of-order commands); and/or analyzed header or payload parameters to determine compliance. It is envisioned that the rules may be updated from an external source, such as via a remote source (e.g., threat intelligence network 290), in a periodic or aperiodic manner.

In one embodiment, the static analysis logic system 120$_1$ may include vector logic 247 that is configured to determine source information with regard to the object 160. In one embodiment, it is envisioned that the determinations made on behalf of the vector logic 247 may be performed quickly, and thus may logically and often precede other determinations made by the static analysis 120$_1$. For example, in one embodiment, the vector logic 247 may be configured to determine the source of the object 160, e.g., whether the object 160 was communicated via a communication scheme including, but not limited or restricted to email, file-share, file transfer protocol (FTP), web download, etc., without limitation. In one embodiment, vector logic 247 may be configured to analyze the object 160 to determine source device type or version information associated with the object 160. Thus, it should be understood that the object 160 may be associated with multiple vectors. Accordingly, it is envisioned that the determination with regard to maliciousness may be predicated, at least in part, upon analysis by the vector logic 247.

It is envisioned that information associated with the object 160 may be further analyzed using the dynamic analysis logic system 120$_2$. Herein, the dynamic analysis logic system 120$_2$ comprises a virtual machine manager 250, a data store 252 and one or more virtual machines (VMs) 255, namely VM$_1$ 255$_1$-VM$_M$ 255$_M$ (M≥1). The VMs 255 are configured to perform in-depth dynamic (behavioral) analysis on the object 160 during processing in order to detect anomalous behaviors. In general terms, the VMs 255 simulate a run-time environment as expected based on the type of object 160. Herein, the dynamic analysis logic system 120$_2$ is adapted to provision one or more VMs 255$_1$-255$_M$ (e.g., VM$_1$-VM$_M$) using information from the extraction logic 110 (e.g., meta data 161) and/or information from the static analysis logic system 120$_1$ (e.g., information gathered by the vector logic 247).

Monitoring logic 257 within the dynamic analysis logic system 120$_2$ may observe one or more behaviors with respect to the object 160 during processing within one or more VMs 255, where these behaviors may be used in a determination by the classification engine 130 as to whether the object 160 is malicious (i.e. a likelihood of maliciousness for the object 160). Using the dynamic analysis logic system 120$_2$, certain artifacts that may be unique with respect to a type of malware attack may be analyzed. For example, dynamic analysis logic system 120$_1$ may consider propagation mechanisms of the object 160, to determine how instructions and/or behaviors associated with the object 160 communicate or navigate across and/or through a network, for example.

According to one embodiment, each of the VMs 255 (e.g., VM$_1$-VM$_M$) within the dynamic analysis logic system 120$_2$ may be configured with a software profile corresponding to a software image stored within the data store 252 that is communicatively coupled with the virtual machine manager 250. Alternatively, the VMs 255 (e.g., VM$_1$-VM$_M$) may be configured according to a prevalent software configuration, software configuration used by a network device within a particular enterprise network (e.g., client device 220), or an environment that is associated with the object to be processed, including software such as a web browser application, PDF™ reader application, data processing application, or the like.

However, it should be understood for a known vulnerability that the VMs 255 (e.g., VM$_1$-VM$_M$) may be more narrowly configured to profiles associated with vulnerable modules. For example, if the access source comprises a certain memory type, VM$_1$ 255$_1$-VM$_M$ 255$_M$ may be configured for faster processing and corresponding log file generation. Similarly, when relevant, if the access source is attempting to access a particular application, email address book, etc., then VM$_1$-VM$_M$ 255 may be configured accordingly.

As further shown in FIG. 2, the object 160 may be further analyzed using the emulation logic system 120$_3$, which is configured so as to enable the malware detection system 100 ("host" system) to behave like any another computer system ("guest" system). It is envisioned that the emulation logic system 120$_3$ may be configured so as to enable the host system to run any of various software, applications, versions and the like, designed for the guest system. More specifically, under control of request processing logic 260, the emulation logic system 120$_3$ may be configured so as to model hardware and software. As such, the emulation logic system 120$_3$ may be divided into modules that correspond roughly to the emulated computer's various systems, and as a result, the emulation logic system 120$_3$ comprises subsystems 265. In one embodiment, the subsystems 265 comprise any of various processor emulator/simulators, a memory subsystem module, and/or various I/O devices emulators.

Figure 3:
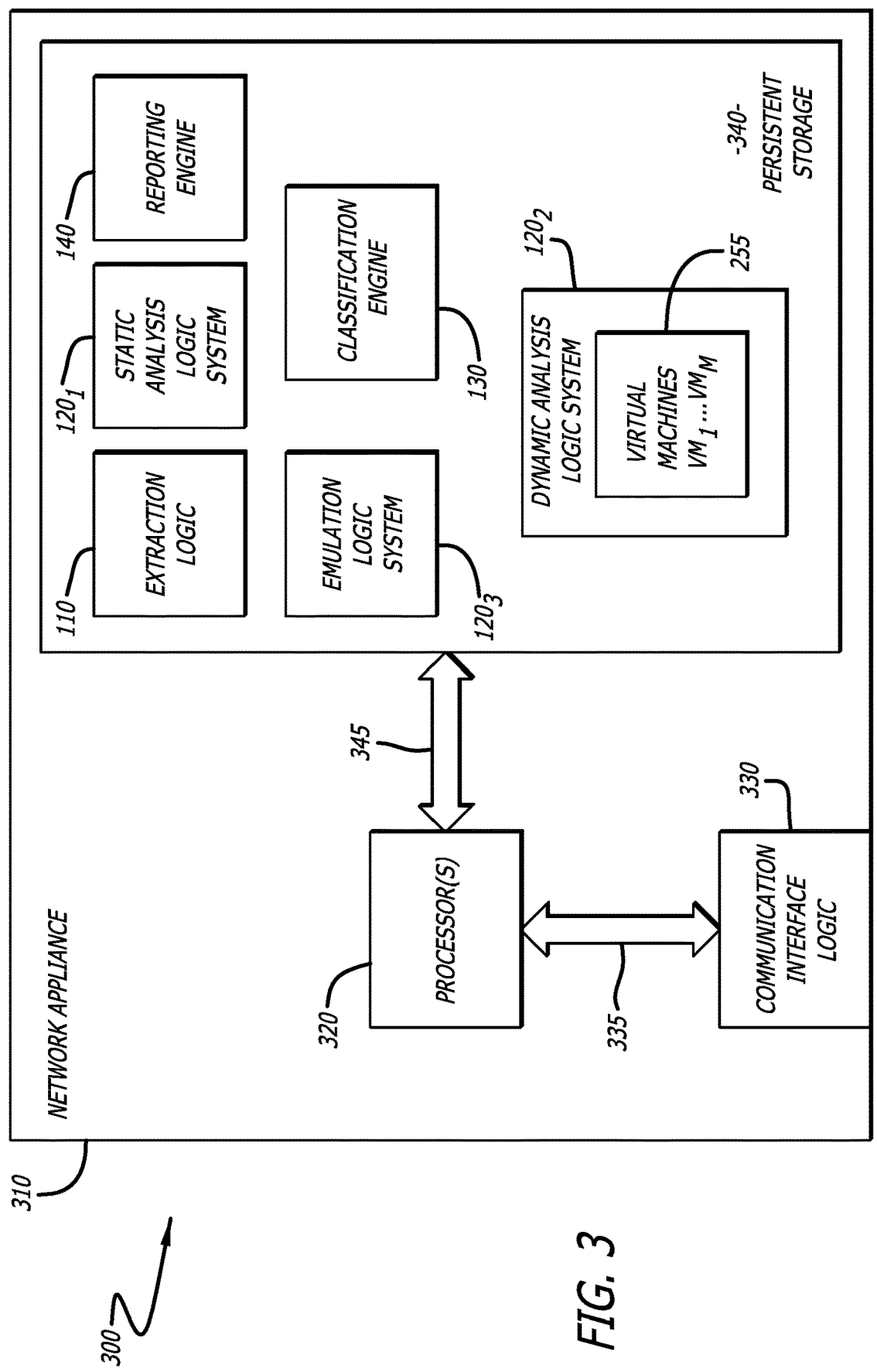
FIG. 3 is an exemplary embodiment of a logical representation of the malware detection system of FIG. 2.

It should be understood that the extraction logic 110, the static analysis logic system 120$_1$, the dynamic analysis logic system 120$_2$, the emulation logic system 120$_3$, the classification engine 130, and/or the reporting engine 150 may be implemented as one or more software modules executed by one or more processors as shown in FIG. 3 below. The processor(s) may be located within the same processor package (e.g., different processor cores) and/or located at remote or even geographically remote locations that are communicatively coupled (e.g., by a dedicated communication link) or a network.

Referring now to FIG. 3, an exemplary embodiment of a logical representation of the malware detection system 100 of FIGS. 1A-1C and 2, deployed as a network appliance 300, is shown. In one embodiment, the network appliance 300 comprises a housing 310, which is made entirely or partially of a rigid material (e.g., hardened plastic, metal, glass, composite or any combination thereof) that protect circuitry within the housing 310, namely one or more processors 320 that are coupled to communication interface logic 330 via a first transmission medium 335. Communication interface logic 330 enables communications with other malware detection systems 100N and/or the threat intelligence network 290 of FIG. 2, for example. According to one embodiment of the disclosure, communication interface logic 330 may be implemented as a physical interface including one or more ports for wired connectors. Additionally, or in the alternative, communication interface logic 330 may be implemented with one or more radio units for supporting wireless communications with other electronic devices.

Processor(s) 320 may further be coupled to persistent storage 340 via a second transmission medium 345. According to one embodiment of the disclosure, persistent storage 340 may include one or more software modules associated with the functionality of the malware detection system 100, which may include the extraction logic 110, the static analysis logic system 120₁, the dynamic analysis logic system 120₂, the emulation logic system 120₃, the classification engine 130, and/or reporting engine 150. It is envisioned that one or more of these systems (or engine) could be implemented externally from the malware detection system 100 without extending beyond the spirit and scope of the present disclosure.

Although not illustrated, it is contemplated that all or a portion of the functionality of the malware detection system 100 may be deployed at part of cloud services. For instance, dynamic analysis logic system 120₂ of FIG. 2 may be deployed in cloud services, which conducts behavioral analysis on an object. Alternatively, at least some functionality of the classification engine 130 of FIG. 2 may be deployed within cloud services. Alternatively, some or all of the functionality of the malware detection system 100 may be deployed as part of client device functionality, where a security agent deployed in the client device performs such functionality described herein. Therefore, it is within the spirit of the invention that the malware detection system may reside entirely within a single network appliance or device, or may be deployed as a decentralized system with different functionality being handled by different network devices, including cloud services.

B. General Analysis Methodology with Respect to the Plurality of Analyses

Figure 4:
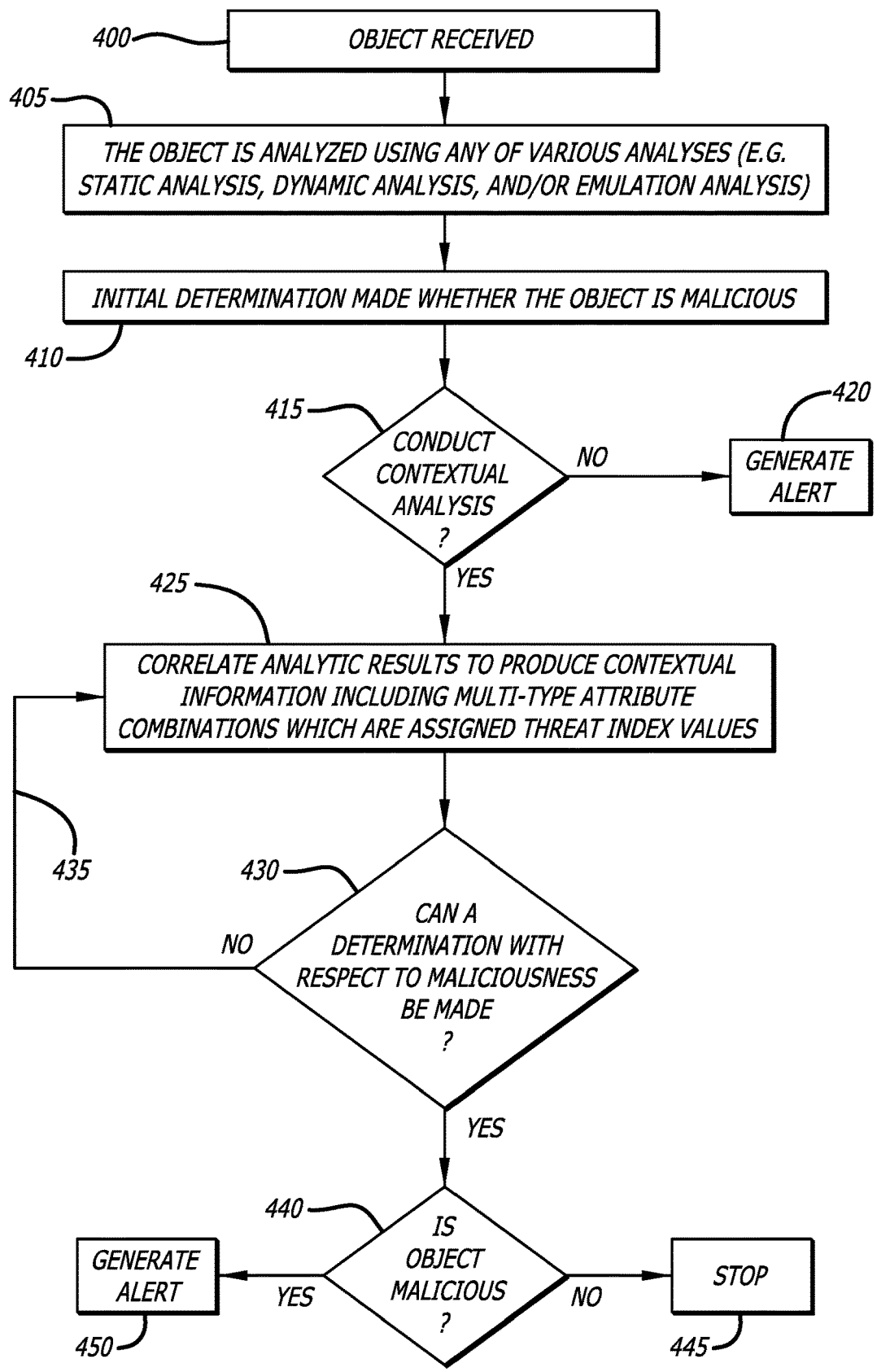
FIG. 4 is an exemplary flowchart of a contextual analysis of attributes associated with an object obtained through a plurality of analyses.

Referring now to FIG. 4, a flowchart of an exemplary method for analyzing an object using a plurality of analyses is shown. Herein, the malicious detection system receives an object (block 400). Thereafter, the received object is analyzed using any of the various analyses as discussed herein such as static analysis, dynamic analysis, and/or emulation analysis (block 405). An initial determination may be made with respect to maliciousness of the object if there is any attributes (e.g., characteristic(s), behavior(s), and/or emulated result(s)) that present dispositive evidence thereto (block 410) and whether contextual analysis is to be conducted (block 415). At block 420, an alert may be generated if maliciousness is determined and no further contextual analysis is desired.

Otherwise, as described herein, a contextual analysis is conducted where, in accordance with the expanded correlation rule set, attributes from the different analysis logic systems are correlated to produce one or more multi-type attribute combinations (e.g., one or more characteristics from the static analysis logic system and at least one or more behaviors from the dynamic analysis logic system). The multi-type attribute combinations may correspond to multi-type attribute patterns set forth in the expanded correlation rule set. Thereafter, the multi-type attribute combinations are assigned a threat index value that may be used, at least in part, by the object classification logic when classifying the object as malicious or non-malicious (block 425). Thereafter, a determination may be made with respect to maliciousness, in view of the contextual information that includes one or more multi-type attribute combinations (block 430).

If not, one or more secondary contextual analyses may be conducted in which one or more additional analyses are conducted on the object (or a portion of the object) to confirm a presence (or absence) of one or more particular attributes (feedback 435). Based on one or more secondary contextual analyses to improve accuracy of malware detection, a determination is made as to whether the object is malicious or non-malicious (block 440). If non-malicious, the analysis is stopped for the object (block 445). If the object is classified as malicious, an alert may be generated (block 450).

To provide more detail with respect to the analysis methodology, referring back to FIG. 2, analytic results from each of the various analysis logic systems 120₁-120ₙ may be routed to the classification engine 130 for further processing. As shown, the classification engine 130 comprises the attribute correlation logic 140, threat index generation logic 142 and the object classification logic 144. According to one embodiment of the disclosure, the object classification logic 144 is configured to classify the object 160 in response to operations by the correlation logic 270. The correlation logic 270 includes the attribute correlation logic 140 that is responsible for correlating attributes 170₁-170₃ in accordance with the extended correlation rule set 136 stored in data store 278. The extended correlation rule set 136 includes attribute patterns that are considered in determining whether or not the object 160 is malicious. Herein, one or more of the attribute patterns are directed a multi-type attribute combination, which may include one or more characteristics and one or more behaviors.

The correlation logic 270 further includes threat index generation logic 142 that includes an index assignment logic 272 and a weighting logic 274. Responsive to detecting contextual information (correlated attributes) that correspond to a particular attribute pattern, the index assignment logic 272 assigns a corresponding threat index value to the contextual information while the weighting logic 274 may apply a weighting (when applicable). It is contemplated that the application of a threat index value and/or weighting may be applied to each attribute (i.e. each characteristic [C], behavior [B], or emulated result [E]) or may be applied to each combination of attributes, notably multi-type attribute combinations (e.g., [C, B], [C, E], or [B, E]).

Previously, the analytic results from the analysis logic systems (static analysis logic system 120₁, dynamic analysis logic system 120₂, and/or emulation logic system 120₃) have been considered independently of each other to determine that a particular object 160 is non-malicious. However, to provide greater accuracy with regard to such determinations, the attribute correlation logic 140 within the correlation logic 270 is configured to correlate at least one or more characteristics and one or more behaviors as resultant contextual information, where the detected presence of the contextual information is assigned an threat index value that influences a determination as to whether the object is malicious or not and decrease the incidence of "false negative" and/or "false positive" outcomes.

By way of illustrative example, consider an organization that receives an object 160 comprising a file with a ". SCR" extension that features hidden malware. Typically, ". SCR" files are executable files that can be configured to display vector graphic or text animations, play slide shows, animation, etc., and may include sound effects. In other words, the ".SCR" file is typically associated with benign, non-malicious behavior. Thus, when considered independently (for example, using the static analysis logic system 120₁), a determination may be erroneously made that the .SCR file is non-malicious (benign), demonstrating the potential for returning "false negative" outcomes.

Accordingly, to prevent such "false negative" outcomes and harm to a client's device, the correlation logic 270 is configured to consider the object 160 in view of the other analyses. For example, when the .SCR file is examined by the dynamic analysis logic system 120₂ and/or the emulation logic system 120₃, certain behaviors and emulated results may be determined, respectively that indicate that the .SCR file is actually malicious. More specifically, the dynamic analysis logic system $120_2$ may reveal that when executed, the .SCR file actually includes instructions to perform network activity (such as performing an HTTP 'GET' request or any other similar instruction), which may be consistent with maliciousness. Accordingly, the classification engine 130 may consider the behaviors as determined from the dynamic analysis logic system $120_2$ in view of the characteristics determined from the static analysis logic system $120_1$, thereby providing greater accuracy in determining maliciousness.

It is envisioned that based on the file size and/or complexity of the object 160, the various analyses as discussed herein may begin and/or complete at differing times. Thus, it should be appreciated that the various analyses may be performed concurrently (at same time or in an overlapping manner), serially, and/or recursively, without limitation and secondary contextual analyses may be necessary to confirm the presence or absence of certain analytic results.

Using another illustrative example, in one embodiment, the object 160 of FIG. 2 may be observed using the dynamic analysis logic system $120_2$, which may reveal behaviors such as network activities that appear to be benign when considered independently of any of the other analysis logic systems. For example, the object 160 may include a link that is configured to navigate to a certain URL ("first destination") on the Internet. However, prior to indicating that the object 160 is benign or malicious due to this aspect, context logic 276 of the correlation logic 270 may be configured to conduct a "recursive" (or secondary) contextual analysis to consider characteristics determined from the static analysis logic system $120_1$ based on various rules, experiential knowledge, signatures and the like that may be stored on the data store 278. Using such information, the context logic 276 may query the static analysis logic system $120_1$ (or access locally stored characteristics) to determine by way of non-limiting example, whether the object 160 was signed or un-signed; whether the object 160 was packed or unpacked; and/or the communication protocol of the object 160. Hence, the static analysis logic system $120_1$ may reveal, for example, that the object 160 actually included a URL that was supposed to navigate to a second destination, rather than observed first destination. Thus, by noting such inconsistencies and considering the various determinations in such a contextual manner, the incidence of "false negative" outcomes is greatly reduced.

Similar, in another embodiment, the object 160 of FIG. 2 may be observed using the dynamic analysis logic system $120_2$, which may include behaviors such as network activities that appear to be malicious when considered independently of any of the other analysis logic systems. However, the correlation logic 270 may correlate the behaviors with certain characteristics that may reveal, for example, that the behavior monitored during processing of the object 160 are actually non-anomalous. Thus, by considering a collection of attributes together as a multi-type attribute communication and in such a contextual manner, the incidence of "false positive" outcomes is greatly reduced as well.

In yet another embodiment, the results of the static analysis may be used to update the dynamic analysis and/or the emulation. In one embodiment, aspects of the object 160 may be analyzed in any order by the static analysis logic system $120_1$, the dynamic analysis logic system $120_2$, and/or the emulation logic system $120_3$. Indeed, in one embodiment, the various analyses as discussed herein may be applied at various times, and to various portions of the object 160.

In other words, any analysis can be revisited, or performed more than once, as needed. Thus, the malware detection system 100 is highly configurable and adaptable depending on the types of objects 160 and corresponding content that is received in order to reduce "false negative" outcomes as well as "false positive" outcomes.

C. General Indexing Methodology with Respect to the Plurality of Analyses

Figure 5:
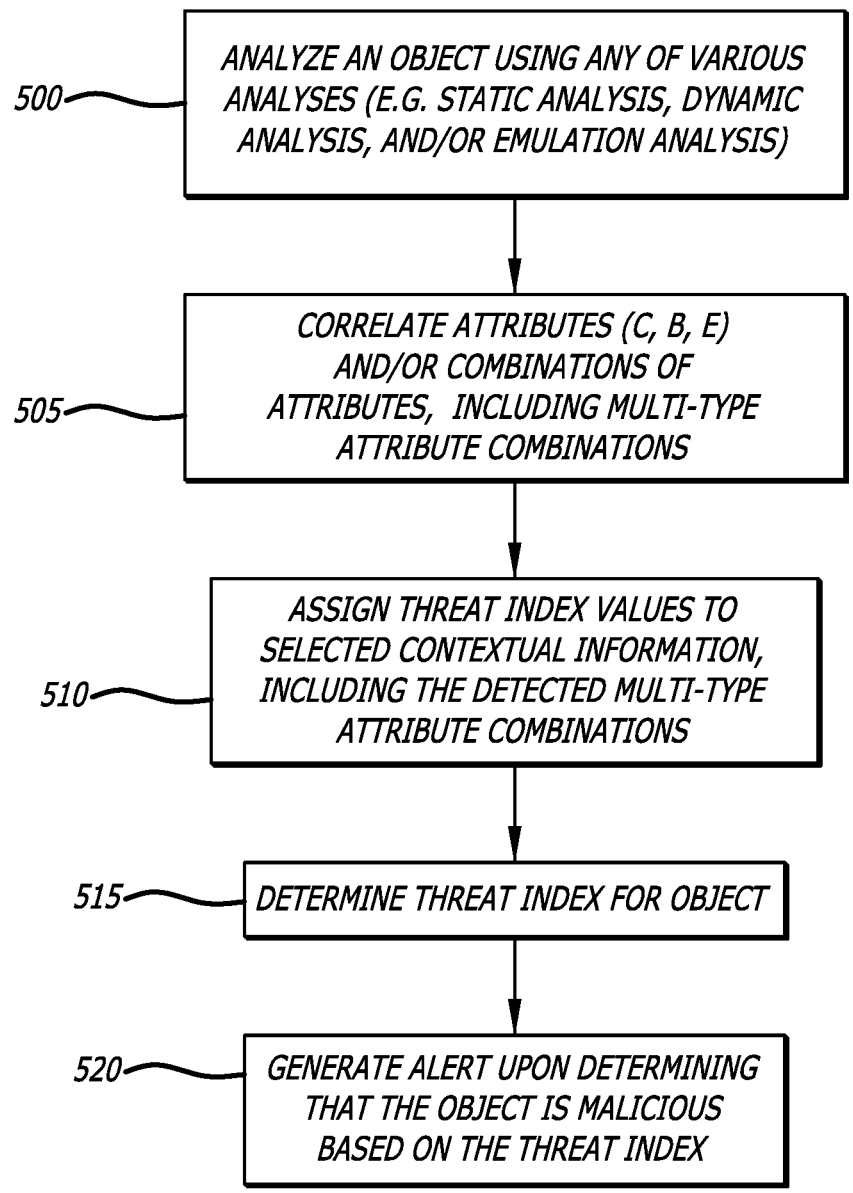
FIG. 5 is a flowchart of an exemplary method for applying threat index values on an observed multi-type attribute combination with characteristics, behaviors and/or emulated results during correlation and classification of the object.

Referring now to FIG. 5, a flowchart of an exemplary method for applying threat index values to observed attributes (e.g., characteristic(s), behavior(s) and/or emulated results) associated with an object under analysis is shown. For example, an object is received and subsequently analyzed using any of the various analyses such as the static analysis, the dynamic analysis, and/or the emulation analysis (block 500).

For example, a static analysis of the object may detect one or more characteristics ($C_1, C_2, C_3, \ldots C_x$; $x \geq 1$), where these attributes (characteristics) are provided to the correlation logic. Similarly, the dynamic (behavioral) analysis of the object during processing within a protective environment (e.g., virtual machine) may observe one or more behaviors ($B_1, B_2, B_3, \ldots B_y$; $y \geq 1$), where these attributes (behaviors) also are provided to the correlation logic. As an optional analysis, an operating environment for the object may be emulated and the emulated operations by the object may determine one or more emulated results ($E_1, E_2, E_3, \ldots E_z$; $z \geq 1$).

According to one embodiment, these attributes may be correlated by the correlation logic to determine the presence or absence of attribute patterns that are assigned threat index values and are considered in determining whether the object is malicious (block 505). Herein, the attribute patterns may include multi-type attribute patterns that include attributes from different analysis types $\{[C_1, C_2, B_1]; [C_1, C_3, B_1, B_2]; [C_1-C_4, B_1-B_3, E_2]; [B_1, B_2, E_1]; [C_1, E_1, E_2]; \text{etc.}\}$. It is contemplated that only multi-type attribute patterns exceeding a certain predetermined threat index value may be evaluated to reduce system load.

Upon determining some multi-type attribute combinations $\{[C_1, C_2, B_1]; [C_1, C_3, B_1, B_2]\}$ corresponding to the multi-type attribute patterns $\{(C_1, C_2, B_1); (C_1, C_3, B_1, B_2)\}$, these multi-type attribute combinations may be assigned a corresponding threat index value by the indexing assignment logic (block 510). Of course, it is contemplated that each analytic result may be individually assigned a threat index value ($[C_1]; \ldots; [C_x]; [B_1]; \ldots; [B_y]; [E_1]; \ldots; [E_z]$).

Optionally, although not shown, certain weights may be assigned to the threat index values using the weighting logic of FIG. 2. In general, the assigned threat index values may be combined and compared with a predetermined threshold value that may vary depending on any of various factors, including by way of non-limiting example, the number and/or existence of various API calls, request-response sessions, and geographical information regarding the most recent, and/or previously targeted parties. Accordingly, it should be understood that the predetermined threshold value might vary for different types of malware attacks. Of course, in other instances, the threshold value may be adapted to accommodate any number of attributes depending on the type of malware attack.

At block 515, according to one embodiment, the threat index for the object may be determined based on the aggregate of threat index values associated with selected attributes and/or combinations of attributes provided from the threat index generation logic. Herein, the threat index may represent a score that represents a likelihood that the object is or contains malware, and in some embodiments, a degree of severity of the attack representative by the selected attribute or combination of attributes. For example, unauthorized exfiltration of data may represented as high severity. However, it is contemplated that the threat index may also be used to "flag" a presence of an object that violates a policy of the customer or identify an ordering of contextual analyses where multiple objects are being examined concurrently. In fact, a secondary contextual analysis may be repeated iteratively until maliciousness can be determined within a certain range of probabilities. Additionally, or in the alternative, the contextual analysis may be completed when all possible combinations of characteristics, behaviors, and/or emulated results have been analyzed and/or appropriately "indexed". Of course, the analysis could also end after a certain subset of combinations have been considered.

At block 520, an alert may be generated in response to the object being determined to be malicious based on the threat index. More specifically, once the classification engine 130 of FIG. 2 has determined to a degree of certainty (often substantially less than 100%) that the object 160 may be malicious and/or benign, the classified result 175 is communicated to the alert generation logic 280 of the reporting engine 150, which may generate the alert 180 and/or route contextual information that may be part of the alert 180 to security administrators for example, communicating the urgency in handling and preferably preventing one or more predicted attacks. The alert 180 may also include detailed instructions pertaining to specific attack types, potential issues thereto, security holes, and best practices to prevent one or more predicted malware attacks.

It should be appreciated that the reporting engine 150 may also be configured to update the threat intelligence network 290 with information corresponding to the instantly analyzed object 160 for future reference and/or further processing. Additionally, the reporting engine 150 may be configured so as to store the classified results in the data store 285 for future reference. Specifically, the data store 285 may be configured so as to tracking vulnerability exploitation, memory corruption, arbitrary code execution, and other definitive malicious actions, and correlate such data as needed.

D. Exemplary Alert

Figure 6:
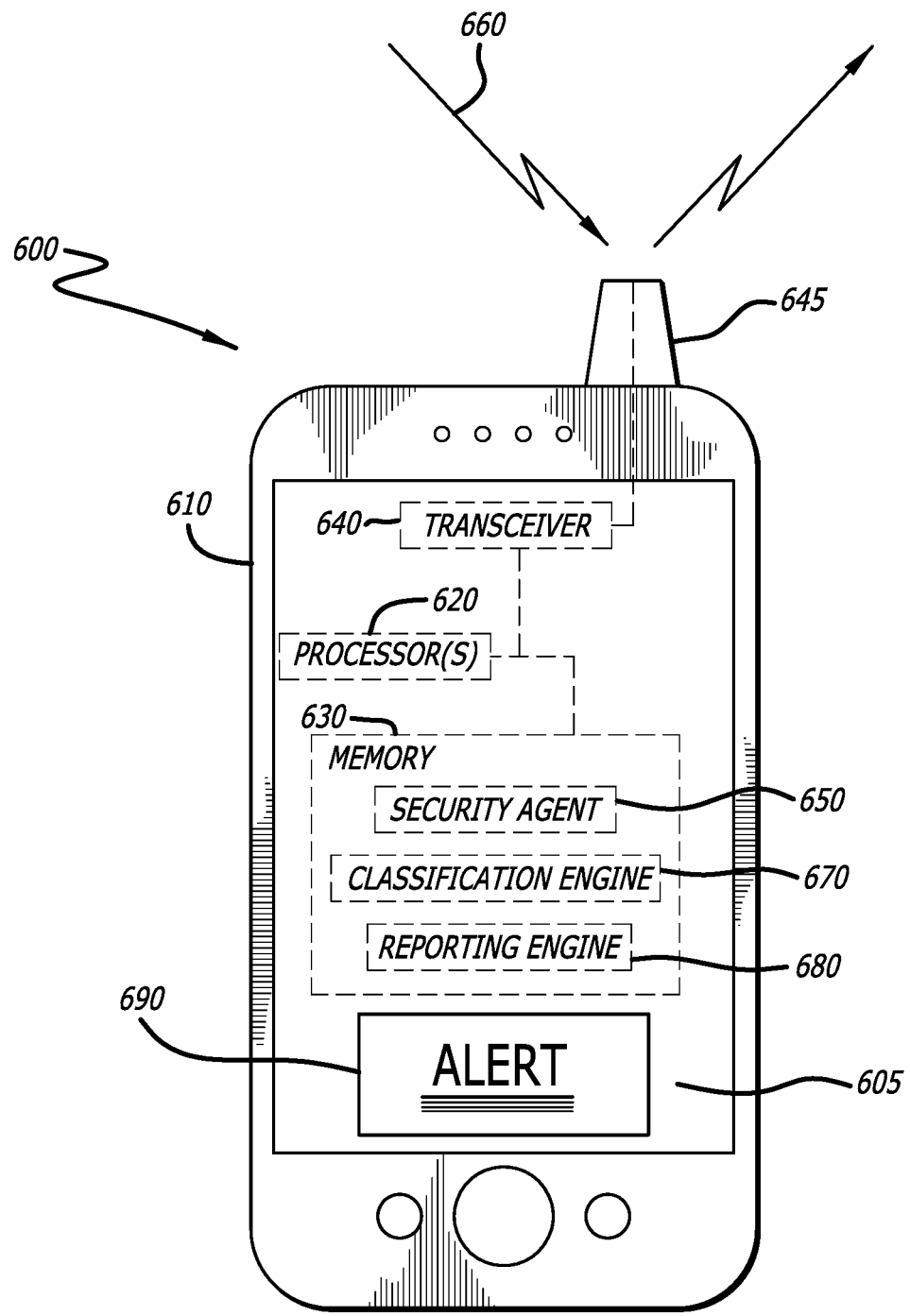
FIG. 6 is an exemplary network device demonstrating an alert according to the present disclosure.

Referring to FIG. 6, an exemplary embodiment of a mobile network device 600 (e.g., smartphone, tablet, laptop computer, netbook, etc.) configured for performing the contextual analyses described above is shown. Herein, the mobile network device 600 includes a display screen 605 and a housing 610 that encases one or more processors ("processor(s)") 620, memory 630, as well as one or more receiver and/or transmitter (e.g. transceiver) 640 communicatively coupled to an antenna 645. Herein, the memory 630 includes a security agent 650.

Upon execution by the processor(s) 620, the security agent 650 (executable software application) conducts static and dynamic analyses of at least a portion of information (referred to as "suspect object 660) received by the transceiver 640 of the endpoint device 620. As described above, the security agent 650 conducts a static analysis of the suspect object 660 to obtain certain characteristics and conducts a dynamic analysis of the suspect object 660 in accordance with the fully-instrumented software profile. The characteristics and certain monitored behaviors by the suspect object 660 during processing may be stored in an event log that is allocated within memory 630.

Herein, memory 630 may further include the classification engine 670 and reporting engine 680 that operate in combination with the security agent in a manner similar to classification engine 130 and reporting engine 150 of FIGS. 1A-1C and 2 as described above. In particular, multi-type attribute patterns are evaluated by correlation logic within the classification 670 and detected multi-type attribute combinations are assigned index values and are considered in classifying the suspect object 660 as malicious or not.

In one embodiment, an exemplary alert 690 (e.g., an object, text message, display screen image, etc.) is communicated to security administrators and/or may be displayed for viewing on the mobile network device 600. For example, the exemplary alert 690 may indicate the urgency in handling one or more predicted attacks based on the maliciousness of the suspect object. Furthermore, the exemplary alert 690 may comprise instructions so as to prevent one or more predicted malware attacks. The exemplary alert 690 may also comprise information with respect to the origination of the potential attack, along with suspicious behavior that might confirm the attack with respect to a potential target. In one embodiment, the exemplary alert 690 may include index values represented as scores and/or percentages based on the various analyses and/or the combination of detected behaviors, characteristics and/or emulated results that caused the alert 690, as discussed herein.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method for detecting malware associated with an object, the method comprising:
    analyzing, by a static analysis logic system, an object to obtain a first set of attributes, the first set of attributes includes one or more characteristics associated with the object;
    processing the object within a virtual machine associated with a dynamic analysis logic system and obtaining a second set of attributes, the second set of attributes corresponding to one or more monitored behaviors of the virtual machine during processing of the object;
    conducting a secondary analysis to determine a threat index for the object based, at least in part, on an analysis of a multi-type attribute combination being a combination of at least one attribute of the first set of attributes received from the static analysis logic system and at least one attribute of the second set of attributes received from the dynamic analysis logic system, wherein the multi-type attribute combination being analyzed collectively as contextual information and the threat index representing a probability of maliciousness associated with the object; and
    conducting an analysis of the object for a particular attribute in response to the particular attribute being absent from the multi-type attribute combination and present in an attribute pattern of a plurality of attributes patterns being used to identify whether the object is malicious or non-malicious.

2. The computerized method of claim 1, wherein the conducting of the secondary analysis to determine the threat index for the object further comprises determining whether the combination of the at least one attribute of the first set of attributes and the at least one attribute of the second set of attributes forming the multi-type attribute combination matches the attribute pattern of the plurality of attribute patterns forming an expanded correlation rule set that is evaluated by a correlation logic within a classification engine to determine whether the object is malicious or non-malicious.

3. The computerized method of claim 1, wherein the one or more characteristics include information pertaining to the object acquired without executing or opening the object.

4. The computerized method of claim 3, where the one or more characteristics include one or metadata anomalies and formatting anomalies associated with the object.

5. The computerized method of claim 1, wherein prior to analyzing the object to obtain the first plurality of analytic results, the method further comprising:
parsing an electronic mail (email) message including the object to extract information from a header or body of the email message, the extracted information being used, at least in part, to determine the threat index for the object.

6. The computerized method of claim 1, wherein prior to analyzing the object to obtain the first plurality of analytic results, the method further comprising:
parsing a message including the object to extract information from a header or body of the message, the extracted information being used, at least in part, to determine the threat index for the object, the message being one or more packets being part of network traffic.

7. The computerized method of claim 6, wherein the information from the header of the message comprises at least one of an hypertext transfer protocol (HTTP) request field or an HTTP response field.

8. The computerized method of claim 6, wherein the information from the header of the message comprises a File Transfer Protocol (FTP) header.

9. The computerized method of claim 1, wherein the conducting of the secondary analysis to determine the threat index for the object based on the combination of the one or more characteristics and the one or more monitored behaviors reduces a false-negative event that would have occurred without the analysis of a presence of both the one or more characteristics and the one or more monitored behaviors.

10. The computerized method of claim 1 further comprising:
responsive to the threat index being less than a prescribed threshold, initializing a feedback operation by re-provisioning the virtual machine, and thereafter, processing the object within the virtual machine to determine a presence of a particular attribute of the combination of the at least one attribute of the first set of attributes and the at least one attribute of the second set of attributes that tends to have a larger influence on the classification of the object than other attributes.

11. The computerized method of claim 1, wherein the conducting of the secondary analysis of the multi-type attribute combination includes conducting an analysis of a sequence of characteristics collected from each of the first set of attributes and the second set of attributes.

12. A network device comprising:
one or more processors; and
a memory communicatively coupled to the one or more processors, the memory comprises
a static analysis logic system that, when executed by the one or more processors, obtain a first set of attributes, the first set of attributes include one or more characteristics associated with the object,
a dynamic analysis logic system including a virtual machine and monitoring logic being processed by the one or more processors, the virtual machine to process the object and the monitoring logic to detect a second set of attributes, the second set of attributes corresponding to one or more monitored behaviors of the virtual machine during processing of the object,
a correlation logic communicatively coupled to the static analysis logic system and the dynamic analysis logic system, the correlation logic, when processed by the one or more processors, operates in accordance with a plurality of configuration rules to (i) generate a multi-type attribute combination being a combination of at least a first attribute of the first set of attributes received from the static analysis logic system and a second attribute of the second set of attributes received from the dynamic analysis logic system for detecting whether the object is malicious or non-malicious and (ii) request the dynamic analysis logic system to conduct an analysis of the object for a particular attribute in response to the particular attribute being absent from the multi-type attribute combination and present in an attribute pattern of a plurality of attributes patterns being monitored for by the correlation logic, and
an object classification logic communicatively coupled to the correlation logic, the object classification logic, when processed by the one or more processors, determines a threat index representing a probability of maliciousness associated with the object based, at least in part, on a detection of the multi-type attribute combination being analyzed collectively as contextual information.

13. The network device of claim 12 wherein the correlation logic to determine whether the multi-type attribute combination including at least the first attribute of the first set of attributes and the second attribute of the second set of attributes matches the attribute pattern of the plurality of attribute patterns to determine whether the object is malicious or non-malicious.

14. The network device of claim 13, wherein the one or more characteristics include information pertaining to the object acquired without executing or opening the object.

15. The network device of claim 13, where the one or more characteristics include one or metadata anomalies and formatting anomalies associated with the object.

16. The network device of claim 12, wherein prior to analyzing the object to obtain the first plurality of analytic results, the network device comprising:
an extraction logic to parse parsing an electronic mail (email) message including the object to extract information from a header or body of the email message, the extracted information being used, at least in part, to determine the threat index for the object.

17. The network device of claim 12, wherein the correlation logic to determine the threat index for the object based on the multi-type attribute combination of the one or more characteristics and the one or more monitored behaviors thereby reducing either a false-negative event that would have occurred without the analysis of a presence of both the one or more characteristics and the one or more monitored behaviors.

18. The network device of claim 12 further comprising:
a controller communicatively coupled to the correlation logic, the static analysis logic system and the dynamic analysis logic system, the controller, responsive to feedback signaling from the correlation logic, to re-provision the virtual machine, and thereafter, process the object within the virtual machine to determine a presence of a particular attribute of the multi-type attribute combination that tends to have a larger influence on the classification of the object than other attributes.

19. The network device of claim 12 further comprising:
a controller communicatively coupled to the object classification logic, the static analysis logic system and the dynamic analysis logic system, the controller, responsive to feedback signaling from the object classification logic, to re-provision the virtual machine, and thereafter, process the object within the virtual machine to determine a presence of a particular attribute of the multi-type attribute combination that tends to have a larger influence on the classification of the object than other attributes.

20. The network device of claim 12 being an endpoint device including a security agent, the security agent comprises the static analysis logic system, the dynamic analysis logic system, the correlation logic and the object classification logic.

21. The network device of claim 12, wherein the object classification logic analyzing of the multi-type attribute combination being the combination of characteristics, from each of the first set of attributes and the second set of attributes, that collectively form a sequence of characteristics.

22. An endpoint device comprising:
   one or more processors; and
   a memory communicatively coupled to the one or more processors, the memory comprises
   a static analysis logic system that, when processed by the one or more processors, obtains a first set of attributes, the first set of attributes include one or more characteristics associated with the object,
   a virtual machine to process the object upon which a second set of attributes is detected during processing of the object, the second set of attributes corresponding to one or more monitored behaviors of the virtual machine during processing of the object,
   a correlation logic communicatively coupled to the static analysis logic system, the correlation logic that, when processed by the one or more processors, operates in accordance with a plurality of configuration rules to generate a combination of at least a first attribute of the first set of attributes and the second set of attributes operating as an observed multi-type attribute combination and signal the virtual machine to conduct re-process the object and monitor behaviors of the object for a behavior corresponding to a particular attribute in response to the particular attribute being absent from the multi-type attribute combination and present in an attribute pattern of a plurality of attributes patterns being part of an expanded correlation rule set, and
   an object classification logic communicatively coupled to the correlation logic, the object classification logic that, when processed by the one or more processors, determines a threat index representing a probability of maliciousness associated with the object based, at least in part, on a detection of the observed multi-type attribute combination including the combination of at least the first attribute of the first set of attributes.

* * * * *